Sept. 20, 1955   A. A. POWELL   2,718,227
VISUAL EXERCISING DEVICE
Filed Jan. 29, 1954   2 Sheets-Sheet 1
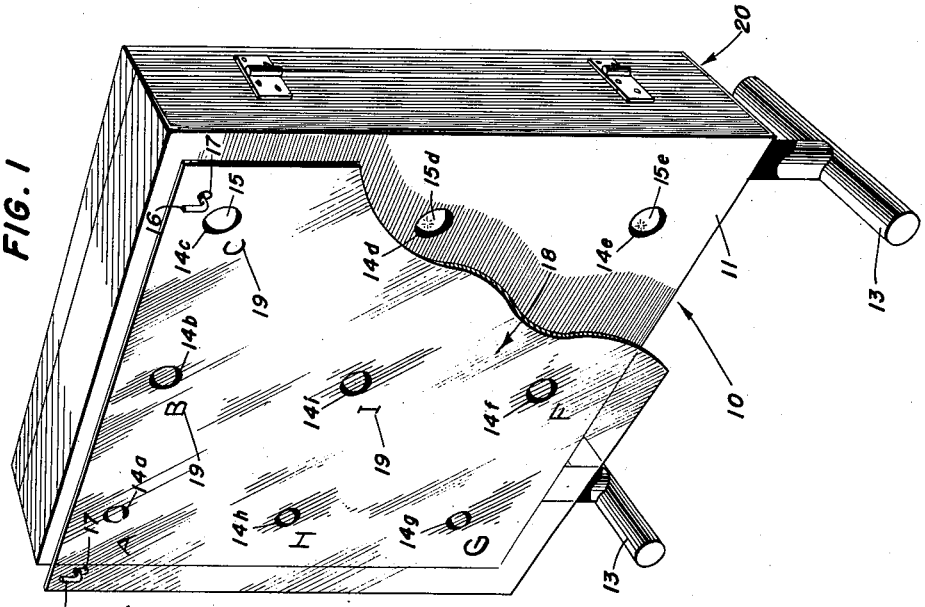
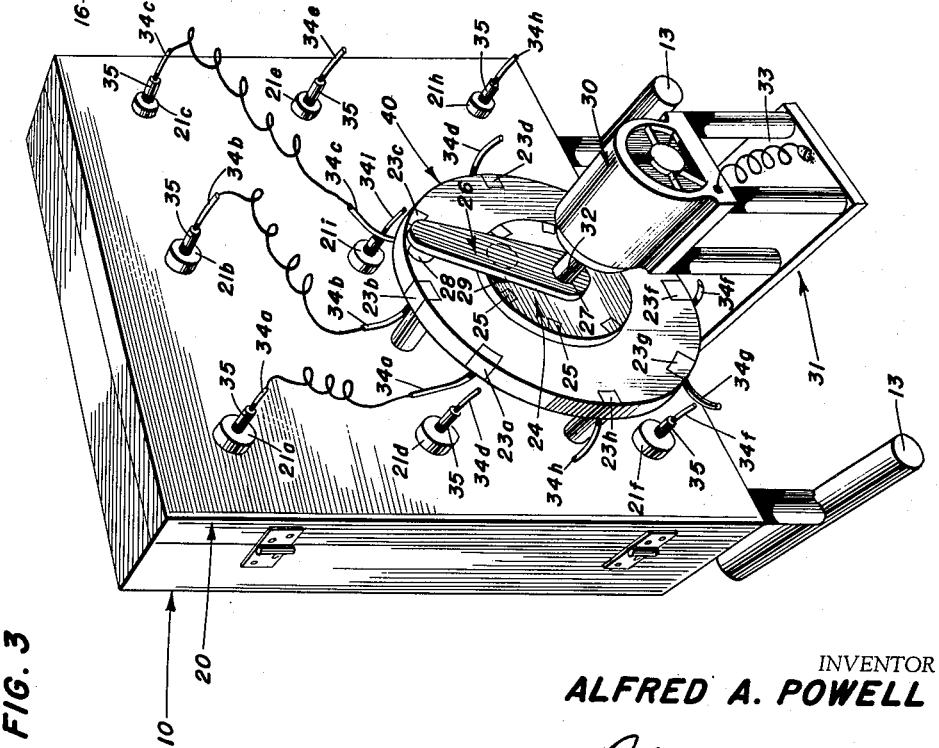
INVENTOR
ALFRED A. POWELL
BY
ATTORNEYS

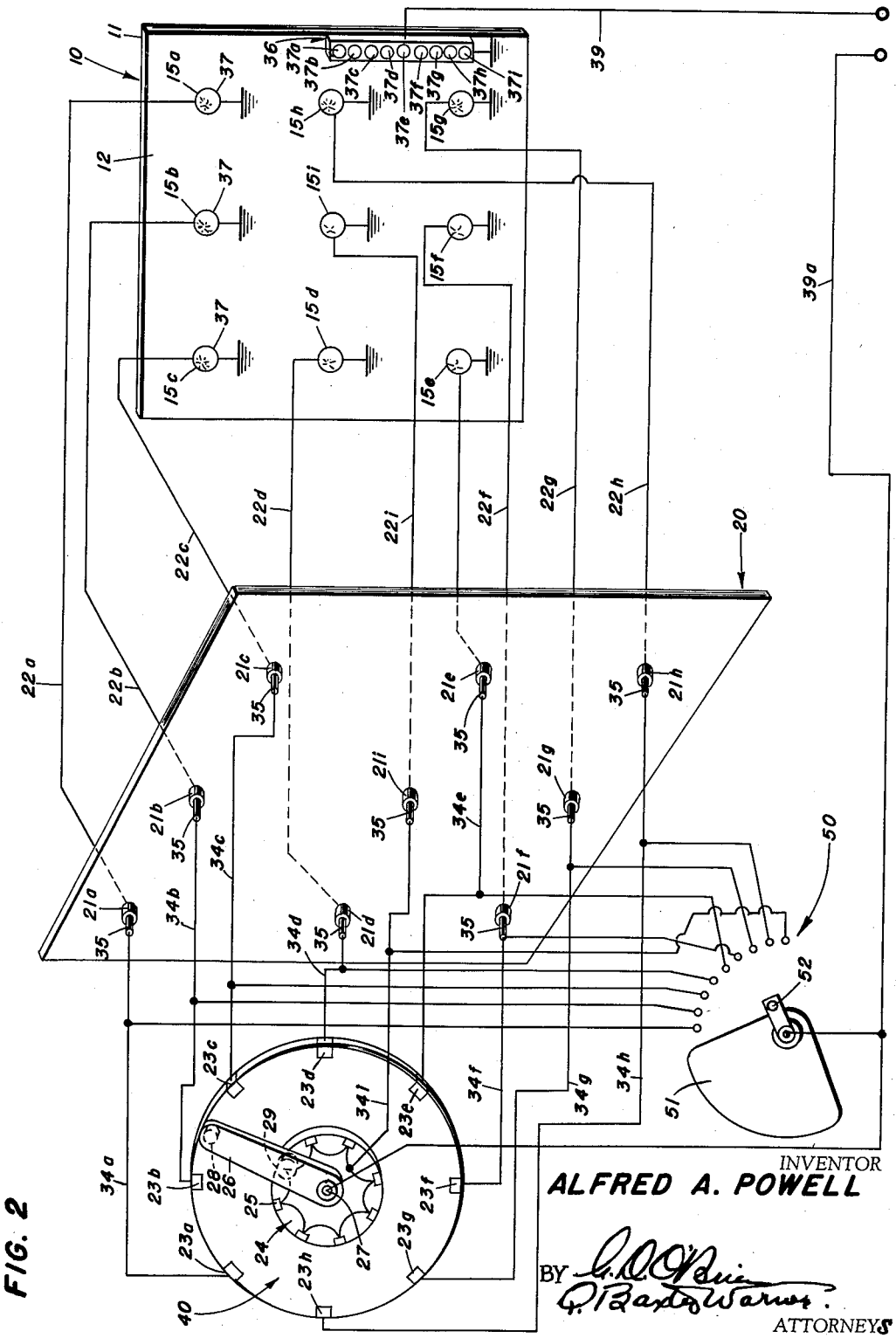

United States Patent Office 2,718,227
Patented Sept. 20, 1955

2,718,227
VISUAL EXERCISING DEVICE

Alfred A. Powell, Fairfax, Va.

Application January 29, 1954, Serial No. 407,186

6 Claims. (Cl. 128—76.5)

(Granted under Title 35, U. S. Code (1952), sec. 266)

The invention described herein may be manufactured and used by or for the Government of the United States of America for governmental purposes without the payment of any royalties thereon or therefor.

The present invention relates to an orthoptic training device and more particularly to a novel and simplified instrument for exercising the external ocular muscles.

It is well-known in the art that many visual defects such as suppression, squints, amblyopia, myoptic reduction, etc. can be corrected or even eliminated by proper visual training. These defects are basically due to the fact that particular ocular muscles are in a weakened condition. Other defects which may be corrected by orthoptic exercises include those in which the sight is gradually decreasing due to poor visual habits. In general, any person whose eyes have defects other than those of a pathological origin may benefit from proper visual exercise. The basic purpose of these exercises is to utilize the weakened ocular muscles to a greater degree than would be the case in the normal use of the eyes. The additional utilization through these exercises will gradually strengthen the subnormal ocular muscles.

It is common knowledge that the eye is an organ which is sensitive to light. In order to exercise the external ocular muscles, the eye must move in such a manner as to utilize these particular muscles. Virtually all visual training devices function by moving a light in a predetermined pattern. The person who is under treatment constantly follows the light with his eye or eyes as the case may be. This moving light may consist of a single light so mounted as to move in the predetermined manner, or of a plurality of lights which are individually lighted in a predetermined sequence. In the past, orthoptic devices have been of such a nature that usually only one pattern can be traced by the moving light thereon. Hence, in order to exercise different ocular muscles more than one orthoptic device may be necessary. The present invention discloses a visual training device which may be adjusted so that numerous patterns of moving lights are possible. Moreover, this invention is sufficiently simple in structure that the patient himself may readily adjust the device to a desired pattern of light and subsequently operate the device. In addition, this invention is based on sound optic principles so that the patient will derive some benefit from the use of this invention when done so under proper guidance.

This invention comprises a substantially vertical box or panel having a plurality of lights arranged on the front face thereof. Located at the rear of the box or panel are control means which primarily consist of a pivotally mounted contact arm engageable with a plurality of contacts. Electrical conductors connect the contacts to the lights and each electrical conductor has a quick detachable socket and plug connector therein. Thus each contact may be connected to a selected light so as to form numerous patterns of a moving light.

It is therefore an object of this invention to provide an orthoptic training device which is sufficiently simple in structure as to be easily operated by the patient undergoing treatment and is based on sound optic principles.

Another object of the invention is to provide an orthoptic instrument which subjects the eyes to such training that normal visual habits are induced therein.

A further object of the invention is to provide an orthoptic instrument wherein a series of lights are successively lit in any one of numerous possible patterns.

An additional object of the invention is to provide a visual training device wherein a plurality of lights are successively lit and are adapted to be followed by the eye of the patient so as to treat the eye for muscular insufficiency.

Other objects and many of the attendant advantages of this invention will be readily appreciated as the same becomes better understood by reference to the following detailed descriptions when considered in connection with the accompanying drawings wherein:

Fig. 1 is a front view in perspective of one embodiment of the invention showing a portion of a transparent screen mounted thereon cut away;

Fig. 2 is a schematic diagrammatic view of the invention showing in detail the wiring circuit; and Fig. 3 is a rear perspective view of the embodiment illustrated in Figs. 1 and 2.

Referring to the drawings wherein like reference characters indicate corresponding parts the numeral 10 (Fig. 1) indicates a panel member for the orthoptic instrument. The panel member 10 may be of any shape but a substantially square member as illustrated in Fig. 1 is preferred. The panel member 10 has a front face 11 and a rear face 12. Suitable base members 13 fastened to the panel member 10 support said panel member in a vertical position. A plurality of recesses 14a through 14i are provided in the front face 11 of the panel member 10. A light 15 is placed in each recess 14a through 14i. Each light 15 preferably consists of an incandescent bulb which gives off an achromatic light.

A pair of hooks 16 project from the top edge of the front face 11. Said hooks 16 are so spaced as to be inserted in a pair of holes 17 near the top edge of a transparent screen 18 which substantially corresponds in size and shape with the front face 11. Symbols 19 may be so placed on the transparent screen 18 that each symbol has a light 15 behind it when the screen is in position. It is intended that the transparent screen be used when the patient being treated is a child or it is desired to insure that the patient's eye actually follows the moving light, since the patient may be requested to call out the symbol which is illuminated by the light behind it. Any form of symbol such as letters, numbers, or in the case of young children, pictures might be used.

In Fig. 2, there is illustrated a terminal board 20 which may be mounted on the rear face of the panel member 10. A plurality of jack connector sockets 21 which are adapted to receive the plug portions of quick detachable electrical jack connectors are mounted in the terminal board 20. The exact arrangement of the connector sockets 21 on the terminal board 20 is immaterial. However, the number of sockets is equal to the number of lights 15. A plurality of electrical conductors 22a through 22i connect each socket 21 with a corresponding light 15a through 15i. The electrical conductors 22 may be permanently connected to both the sockets 21 and the lights 15. A plurality of peripheral contacts 23a through 23h may be mounted on a circular panel 40 which is affixed to the rear face 20 of the box 10. An inner panel 24 having a number of peripheral contacts 25 thereon is concentrically mounted within the circle of the contacts 23a through 23h on the panel 40. The contacts 25 are electrically interconnected and so mounted that each of the contact portions 25 is disposed in an interval between the circularly arranged contacts 23a through 23h.

A sweep arm 26 is pivotally mounted at the point 27 which is the center of the circular arrangement of contacts 23a through 23h and the contacts 25. Near the free end of the contact arm 26 is a wipe 28 which engages contacts 23a through 23h. A second wipe 29 engages the inner row of contacts 25. The wipes 28 and 29 appear in perspective in Fig. 3. As it is preferable to rotate the contact arm 26 at a selected uniform speed, an electric motor 30 is mounted on suitable supports indicated generally as 31. Said motor 30 is connected by means of a shaft 32 to mounting point 27 of the contact arm 26. The electric motor 30 may be of the variable speed type and is connected to a suitable source of electric energy by means of an electric conductor 33.

A plurality of electric conductors 34a through 34h lead from the correspondingly designated contacts 23a through 23h and conductor 34i leads from the central contacts 25. A plug portion 35 of a quick detachable electric jack connector is affixed to the free end of each of the conductors 34a through 34i. The plug portions 35 are adapted to be selectively inserted in the connector sockets 21.

Instead of grounding the lights as shown separate ground wires 37 may lead from each light to a terminal strip 36 mounted on the rear face 12 of the front panel 10. A plurality of terminals 37a through 37i may be provided to which current return connections may be made instead of the grounded circuit shown. A main line 39 is provided which leads from a source of electricity and which has one end connected to all of the terminals 37a through 37i. The second side 39a of the main line is connected to the contact arm 26 on the point 27.

In using this invention it is necessary before any treatment be undertaken that an optometrist determine the exact nature of the visual defect. Upon diagnosis of the defect it will then be possible to prescribe the proper visual exercises which will serve to correct the defect. The invention is illustrated in Figs. 1 through 3 as being wired so as to give that pattern of moving lights which is most commonly used. Consequently, the operation of the invention as it is adjusted in Fig. 2 will be described. It should be borne in mind, however, that this is only one of numerous light patterns which may be achieved with this invention. Other light patterns which may be obtained and the manner of adjusting this invention in order to obtain such light patterns will be later described.

For purposes of explaining the operation of the invention the lights 15 may be divided into two classes, the lights identified as 15a through 15h may be referred to as peripheral lights and the light 15i as the center light.

An examination of Fig. 2 will reveal that the contacts 25 of the inner row are each interconnected and, by the conductor 34i, are connected to the socket 21i. The socket 21i is in turn connected by the conductor 22i to the center light 15i. Likewise, the contacts 23a through 23h are respectively connected by the conductors 34a through 34h to the corresponding sockets 21a through 21h. The sockets 21a through 21h are in turn respectively connected by the conductors 22a through 22h to the corresponding lights 15a through 15h. Consequently, when the motor 30 rotates the contact arm 26 clockwise as viewed in Fig. 2, it will be seen that the sequence in which the lights 15 will be lighted is as follows:

$$i-c-i-d-i-e-i, \text{ etc.}$$

Because of this particular lighting pattern the eye which is being treated is first fixed upon a selected peripheral light, next drawn to the center light, and then back to another selected peripheral light and so on. Thus, it can be seen that by changing the fixation of the eye from each one of the peripheral lights back to the center light this exercise will tend to utilize all of the external ocular muscles of that eye.

For some visual defects it may be desirable to make one of the peripheral lights the principle light to which the eye returns after each fixation on the other lights. This may be accomplished by inserting the plug portion 35 of conductor 34i into the connector socket which is connected to the appropriate peripheral light. The contacts 23a through 23h are then selectively connected to the remaining sockets in any desired pattern.

On occasion it may be desirable to keep certain lights lit while other lights are being lighted. This can be accomplished by the use of switch means 50 of Fig. 2 wherein contacts $a$ to $i$ are shown connected to lines 34a to 34i respectively. The sector shaped control member 51 of this switch may be caused by manual means such as handle 52, or by suitable motor or remote control means, to sweep over the contacts and, as each light is lighted, it will remain lighted while the sector is in engagement with its respective contact.

Thus, it can be seen that in view of the many patterns of moving lights it is possible to achieve with this invention, exercises may be devised to utilize any or all of the external ocular muscles. By utilizing those muscles which are neglected in normal use these particular ocular muscles will be gradually strengthened and numerous visual defects may be corrected.

Obviously, many modifications and variations of the present invention are possible in the light of the above teachings. It is therefore to be understood that within the scope of the appended claims the invention may be practiced otherwise than as specifically described.

What is claimed is:

1. In an optical exercising device having a panel member with front and rear faces and a plurality of lights arranged on the front face of said panel member, a first group of a plurality of contacts mounted adjacent the rear face of said panel member in spaced circular arrangement, said contacts of the first group being one less in number than said plurality of lights, a pivotally-mounted contact arm connected to a source of electrical energy for electrically cooperating with said contacts of the first group, a second group of a plurality of contacts associated with said contact arm whereby said contact portions of the second group are electrically contacted by said contact arm during that period when said contact arm is not engaging one of said contacts of the first group, and electrical connections from said plurality of contacts of the first and second group to be selectively connected to said lights.

2. In an optical exercising device having a panel member with front and rear faces and a plurality of lights arranged on the front face of said panel member, a plurality of contacts mounted adjacent the rear face of said panel member in spaced circular arrangement, said contacts being one less in number than said plurality of lights, a circular stationary member concentrically mounted within said plurality of contacts, said circular stationary member having a plurality of terminal portions on the circumference thereof each of which is aligned with an interval between said plurality of contacts, a pivotally-mounted contact arm which electrically cooperates with said plurality of contacts and said terminal portions, and electrical connections leading from said plurality of contacts and said terminal portions adapted to be selectively connected to said lights.

3. In an optical exercising device having a panel member with front and rear faces and a plurality of lights arranged on the front face of said panel member, the combination of a plurality of jack connector sockets mounted on the rear face of said panel member, each of said connector sockets being electrically connected to one of said lights, a plurality of contacts mounted adjacent the rear face of said panel member in circular arrangement, a contact arm pivotally connected to a source of electrical energy and mounted adjacent the rear face of said panel member so as to electrically cooperate with said plurality of contacts, electrical conductors leading from said plurality of contacts, and a plug portion of an electrical jack connector being affixed to the free end of each of said conductors, said plug portions being adapted to be selectively inserted in said sockets.

4. In an optical exercising device having a panel member with front and rear faces and a plurality of lights arranged on the front face of said panel member, the combination of a plurality of jack connector sockets mounted on the rear face of said panel member, each of said connector sockets being electrically connected to one of said lights, a plurality of contacts mounted adjacent the rear face of said panel member in spaced circular arrangement, said contacts being one less in number than said plurality of lights, a circular stationary member concentrically mounted within said plurality of contacts, said circular member having a plurality of circuit completing elements on the circumference thereof each of which is aligned with an interval between said plurality of contacts, a motor-driven contact arm connected to a source of electrical energy and pivotally mounted adjacent the rear face of said panel member so as to electrically cooperate with said plurality of contacts and said circuit completing elements, electrical conductors leading from said plurality of contacts and said circuit completing elements, and a plug portion of an electrical jack connector being affixed to the free end of each of said conductors, said plug portions being adapted to be selectively inserted in said connector sockets.

5. In an optical exercising device having a panel member with front and rear faces and a plurality of lights arranged on the front face of said panel member, the combination of a terminal board on the rear face of said panel member, a plurality of jack connector sockets equal to the plurality of said lights mounted on said terminal board, permanent electrical connections between said connector sockets and said lights, a plurality of contacts mounted adjacent the rear face of said panel member in spaced circular arrangement, said contacts being one less in number than said plurality of lights, a circular stationary member concentrically mounted within said plurality of contacts, said circular member having a plurality of circuit completing elements on the circumference thereof each of which is aligned with an interval between said plurality of contacts, a motor-driven contact arm connected to a source of electrical energy and pivotally mounted adjacent the rear face of said panel member so as to electrically cooperate with said plurality of contacts and said circuit completing elements, electrical conductors leading from said plurality of contacts and said circuit completing elements, and a plug portion of an electrical jack connector being affixed to the free end of each of said conductors, said plug portions being adapted to be selectively inserted into said connector sockets.

6. In an optical exercising device, the combination of a substantially square panel member having front and rear faces, base members to vertically support said panel member, a recess in the center and a plurality of recesses arranged in the shape of a square near the perimeter of said panel member, a plurality of lights each of which is placed in one of said recesses, a transparent screen positioned over the front face of said vertical panel member and having symbols thereon aligned with said lights when said transparent screen is positioned, a terminal board on the rear face of said panel member, a plurality of jack connector sockets equal to the plurality of said lights mounted on said terminal board, permanent electrical connections between said connector sockets and said lights, a first group of a plurality of contacts mounted adjacent the rear face of said panel member in spaced circular arrangement, said contacts being one less in number than said plurality of lights, a circular stationary member concentrically mounted within said plurality of contacts, said circular member having a second group of a plurality of contacts on the circumference thereof each of which is aligned with an interval between said plurality of contacts of the first group, a motor-driven contact arm connected to a source of electrical energy and pivotally mounted adjacent the rear face of said panel member so as to electrically cooperate with the contacts of said first and second groups, electrical conductors leading from said plurality of contacts and said circular member, and a plug portion of an electrical jack connector being affixed to the end of each of said conductors, said plug portions being adapted to be selectively inserted into said connector sockets.

References Cited in the file of this patent

UNITED STATES PATENTS

| | | |
|---|---|---|
| 1,802,997 | Yelta | Apr. 28, 1931 |
| 1,959,217 | Pieper | May 15, 1934 |